３,081,260
Patented Mar. 12, 1963

3,081,260
LOW SOLIDS DRILLING FLUID
Arthur Park, Tulsa, Okla., assignor to Pan American Petroleum Corporation, Tulsa, Okla., a corporation of Delaware
No Drawing. Filed Mar. 25, 1960, Ser. No. 17,460
6 Claims. (Cl. 252—8.5)

This invention relates to low solids drilling fluids. More particularly, it relates to an additive for giving a drilling fluid some of the properties of a high-solids mud while retaining at least part of the high drilling rate of clear water.

For several years, clear water or water containing a low solids content has been used as the circulating fluid in well drilling operations because of the high drilling rate which results. Two of the difficulties are low viscosity, which results in failure to lift bit cuttings efficiently, and high fluid loss, which results in excessive loss of water to the drilled formations. Obviously, it would be desirable to have a drilling fluid possessing the higher viscosity and lower fluid loss properties of high solids muds, but retaining most of the high drilling rate properties of clear water. Preferably, the drilling fluid should include means for preventing the build-up of a high concentration of drilled solids. Preferably also, the drilling fluid should be compatible with and responsive to ordinary drilling fluid additives.

An object of this invention is to provide a drilling fluid having a high drilling rate, high viscosity, and a low fluid loss. Another object of the invention is to provide an additive for water to form such a drilling fluid. An object of the invention is also to provide a method which will permit high drilling rates, but which will effectively remove cuttings and prevent excessive loss of water to formations drilled.

In general, I accomplish the objects of my invention by the use of a particular type of clay together with a member of a limited class of water-dispersible polymers. These polymers include carboxymethyl cellulose, hydroxyethylether cellulose, guar gum, and polyacrylamide hydrolyte. It has been found that, if about 2 or 3 percent of bentonite or other montmorillonitic clay is added to water together with from about 0.02 to about 0.5 pound of the additive per 42 gallon barrel of water, the viscosity will approach that of a water dispersion containing about twice as much as the clay without the additive. While the colloidal additive tends to decrease drilling rate in the same way as other colloidal materials, it is used in such small amounts that the effects on drilling rate are much less than the effects of the amount of clay which can be omitted. The additive also tends to decrease the fluid loss of the drilling fluid. The over-all result of using the combination of the particular type clay with the specific additives is that the drilling fluid has the properties of low solids mud, while retaining a much higher drilling rate than can normally be obtained with a drilling fluid having such a high viscosity. The practical limits of bentonite concentration are about 2 and 7 percent by weight of the drilling fluid. The lower limit is set by the rather high cost of the large amount of polymer required to obtain good effects at such a low concentration of bentonite. In addition, the higher concentration of polymer becomes a substantial factor in decreasing drilling rate. The upper limit of bentonite concentration is set by the decreased drilling rate which occurs when higher concentrations of bentonite are used.

The term carboxymethyl cellulose indicates a class of materials. Ordinarily, the sodium salt of the carboxymethyl cellulose is indicated. The term CMC will be used hereinafter for convenience to designate sodium carboxymethyl cellulose. For my purposes other alkali metals can be substituted for sodium. The ammonium salt can also be used. CMC itself can vary in two important ways. First, the length of cellulose molecule may vary. Cellulose is a polymer made up of anhydroglucose units. The longer the chain of these units in a polymer, the higher is the viscosity of the resulting CMC. Thus, high viscosity CMC is made up of polymers having high molecular weights. In medium viscosity CMC, the polymers are of lower molecular weight. The second variation in CMC is in the degree of substitution which has taken place when CMC is formed from cellulose. Carboxymethyl groups may be added to any of the three hydroxyl units on each anhydroglucose nucleus. CMC is available having an average of from 0.3 to 1.2 carboxymethyl groups per anhydroglucose unit. Unless otherwise indicated in the following data, the CMC has an average of 0.7 carboxymethyl group per anhydroglucose unit.

Hydroxyethyl cellulose, which is more accurately defined as hydroxyethylether cellulose, does not contain carboxylic acid groups. It does not, for this reason, occur as the metallic salt. Otherwise, the comments made above with regard to CMC apply equally to hydroxyethyl cellulose. For convenience, this material will be referred to hereinafter as HEC.

Guar gum, which is sometimes called guar flour, is formed by milling the endosperm from the guar seed. The guar plant is a legume native to India, but is now grown in rather large quantities in the United States. Guar gum belongs to a class of materials known as gallactomannans which upon hydrolysis yield the two hexose sugars gallactose and mannose. This group of materials is identified and described in more detail in the Journal of the American Chemical Society for October 20, 1952, page 5140.

The acrylamide polymer hydrolytes, for my purposes, should have from about 0.8 percent to about 10 percent of the amide groups replaced by carboxyl groups. That is, the hydrolytes should have about 10 to about 120 amide groups for each carboxyl group. The molecular weight of the hydrolytes should be such that a solution containing 0.5 percent by weight of the polymer in distilled water having a pH of 3 to 3.5 and a temperature of 21.5° C. has a viscosity of at least 4 centipoises as determined with an Ostwald viscosimeter. The hydrolyte may be prepared by polymerizing acrylamide followed by partial hydrolysis of the polymer. This method is described in more detail in Canadian Patent 522,851. The hydrolyte may also be prepared by co-polymerization of acrylamide and acrylic acid. This method is described in more detail in U.S. Patent 2,775,557 issued to R. L. Morgan on December 25, 1956. This U.S. patent also discloses details of the method in which the pure acrylamide polymer is first prepared and then hydrolyzed. The hydrolyte may contain up to about 15 percent of copolymerized monomers other than acrylic acid. These may include such materials as styrene, vinyl acetate, acrylonitrile, and the like. Such copolymers are described in more detail in Canadian Patent 522,850 issued to David J. Pye on March 20, 1956.

Drilling fluids were prepared containing bentonite and the various additives described above. The properties of these drilling fluids were then determined. The compositions of the drilling fluids and their properties are presented in the following table:

| Test No. | Clay Type | Clay Conc., percent by wt. | Additives Type | Additives Conc., lb./bbl. | Fann Visc. | Yield Value | Fluid Loss |
|---|---|---|---|---|---|---|---|
| 1 | Bentonite / Xact | 6 / 6 | None | 0 | 11 | 24 | 11 |
| 2 | Bentonite / Xact | 2 / 2 | None | 0 | 3 | 0 | -------- |
| 3 | Bentonite | 3 | None | 0 | 2 | 1.5 | 26 |
| 4 | Bentonite / Xact | 2 / 2 | Methocel | ½ | Gel broke upon standing | | |
| 5 | Bentonite | 3 | Lustrex X-810 | ¼ | 5 | 2 | N.G. |
| 6 | Bentonite / Xact | 2 / 2 | ----do---- | ½ | 4 | 1 | -------- |
| 7 | Bentonite | 3 | Resin X-820 | ¼ | 3 | 0 | N.G. |
| 8 | Bentonite / Xact | 6 / 6 | Starch | 2 | 14 | 13 | 10 |
| 9 | Bentonite | 3 | High vis. CMC | 0.3 | 6 | 10 | 18 |
| 10 | Bentonite / Xact | 2 / 2 | Med. vis. CMC | ½ | 6 | 5 | -------- |
| 11 | Bentonite / Xact | 2 / 2 | High vis. CMC | ½ | 13 | 21 | 11 |
| 12 | Bentonite | 3 | Med. vis. HEC / $Na_2CO_3$ | 1/20 / 1 | 4 | 9 | 30 |
| 13 | ----do---- | 3 | Med. vis. HEC / $Na_2CO_3$ | 1/10 / 1 | 5 | 17 | 30 |
| 14 | ----do---- | 3 | High vis. HEC | 1/10 | 8 | 22 | 28 |
| 15 | ----do---- | 3 | High vis. HEC / $Na_2CO_3$ | 1/10 / 1 | 8 | 22 | 25 |
| 16 | ----do---- | 3 | High vis. HEC / $Na_2CO_3$ / NaCl | 1/10 / 1 / 3 | 7 | 21 | 32 |
| 17 | ----do---- | 3 | High vis. HEC / $Na_2CO_3$ / NaCl | 1/10 / 1 / 5 | 6 | 20 | 32 |
| 18 | ----do---- | 3 | Guar | 1/10 | 6 | 7 | 25 |
| 19 | ----do---- | 3 | ----do---- | ½ | 7 | 14 | 23 |
| 20 | ----do---- | 3 | ----do---- | 0.3 | 9 | 34 | 25 |
| 21 | ----do---- | 3 | Lytron DX-908 | ⅛ | 77 | 16 | -------- |
| 22 | ----do---- | 3 | Lytron DX-908 / $Na_2CO_3$ | 1/12 / 1 | 44 | 71 | -------- |
| 23 | ----do---- | 2 | Lytron DX-908 / $Na_2CO_3$ | 1/12 / 1 | 22 | 18 | 25 |
| 24 | ----do---- | 3 | Lytron DX-908 / $Na_2CO_3$ / NaCl | 1/12 / 1 / 2 | 12 | 22 | 25 |
| 25 | ----do---- | 3 | Lytron DX-908 / $Na_2CO_3$ / NaCl / $CaCl_2$ | 1/12 / 1 / 2 / 10 | 7 | 7 | -------- |
| 26 | ----do---- | 3 | Lytron DX-908 / $Na_2CO_3$ / $CaSO_4$ | 1/12 / 1 / 10 | 11 | 16 | 47 |
| 27 | ----do---- | 3 | Lytron DX-908 / $Na_2CO_3$ / Oil | 1/12 / 1 / [1]10 | 71 | 25 | 16 |

[1] Oil is 10 percent by volume rather than 10 lb./bbl.

The viscosity and yield value were measured by a variable speed Fann viscosimeter as described in the article "Meter Aids Exact Mud Control," by J. C. Melrose and W. B. Lillenthal, on page 136 of the July 1, 1952, issue of "World Oil." The viscosity is in centipoise units. The yield value is in units of pounds per 100 square feet. The fluid loss values were determined by the standard method described in API Recommended Procedure 29. The units are cubic centimeters per 30 minutes.

In the table, Xact clay is a trademark for a low-yield clay used in the southwest. There is little combination effect between this clay and the additives, in fact some of the additives, such as guar and polyacrylamide hydrolytes tend to flocculate this clay. The term Methocel is a trademark for the methyl ether of cellulose. For many purposes, it is equivalent to CMC and HEC. It will be apparent from the results of test 4, however, that it is not at all equivalent for my purposes. The Lustrex X-810 is a styrene copolymer. This material is not particularly water-dispersible, which may acount for the poor results. The material Resin X-820 is an esterified styrene copolymer. Obviously, the esterification did not improve the property of this material. Other tests with sulfonated polystyrene again indicated that even though such polymers were made water-soluble, they did not produce satisfactory results.

The results of test 8 using starch, when compared to the results of test 1, indicate that even this large amount of starch had little effect on increasing the viscosity of the clay mixture employed.

Tests 4 to 8 are included in the table, since they seem representative of tests with a large number of polymers which might be expected to be equivalent to the four types of materials found to be operable. The results of the tests indicate clearly that for my purposes most polymers are not at all equivalent to the four materials named.

Tests 9, 10 and 11 show the effects of adding CMC to low concentrations of bentonite in water. When the properties of the drilling fluid in test 9 are compared to those of the drilling fluid in test 3, the unexpected improvement derived by using small concentrations of CMC with low concentrations of bentonite becomes apparent. The results of tests 10 and 11 indicate a much greater effectiveness of the high-molecular weight CMC than of the material of lower molecular weight.

Tests 12 to 17 inclusive show the effectiveness of HEC as an additive. Again the high viscosity (high molecular weight material) is obviously much more effective than the lower molecular weight material. Tests 14 and 15 show that the addition of sodium carbonate has little effect on the properties of the drilling fluid containing HEC. Tests 16 and 17 show that drilling fluids containing HEC are somewhat resistant to the effects of salt water. In this case, as with most of the other additives, however, use of the additive with bentonite in brine containing more than 10 or 20 thousand parts per million of chloride and sulfate salts, is not ordinarily recommended.

Tests 18 to 20 show the effects of guar gum. Again, it is apparent that this material is suitable for my purposes.

Tests 21 to 27 demonstrate the effectiveness in very low concentrations of Lytron DX-908. This is one of the polyacrylamide hydrolytes falling within the limits previously described. In this case, it appears that sodium carbonate and the polymer may have a combination effect on the bentonite. Tests 24, 25 and 26 show that high concentrations of salt are rather detrimental to the properties of drilling fluids prepared with low concentrations of bentonite and the hydrolytes.

Test 27 shows that not only are my drilling fluids compatible with oil, but the oil produces an additional increase in viscosity and decrease in fluid loss. This is possibly due to an emulsifying action of both the bentonite and the additive.

It will be noted that of the four types of materials which are operative for my purposes, the polyacrylamide hydrolytes are somewhat more effective as bentonite beneficiating agents. These same hydrolytes are also much more effective as flocculating agents for other clays than members of the other three types of materials. For these reasons, the polyacrylamide hydrolytes are greatly preferred over the other three types.

It will be apparent from the above examples of drilling fluids that by adding a very small amount of one of my polymers to a water dispersion containing a low concentration of bentonite the high viscosity and low fluid loss of high concentrations of bentonite can be obtained. Due to the low concentration of colloids in the dispersion, however, the drilling rate remains high. Thus, it will be apparent that I have accomplished the objects of my invention. When reference is made hereinafter to an additive, it will be understood that I contemplate the use of a single additive or a mixture of additives falling within the defined class of materials. When reference is made to a composition consisting essentially of a number of ingredients, it will be understood that the composition may contain in addition to the material listed other materials, such as Xact clay, drilled solids, sodium carbonate and the like, which do not substantially adversely affect the properties of the drilling fluid.

In actual drilling operations it is advisable, if possible, to prepare a composition from clear water. As this drilling fluid is used in drilling, bit cuttings will, of course, be dispersed in the drilling fluid. I have found that very low concentrations of all four of the classes of materials defined above have a flocculating effect on clays other than those of the montmorillonitic class. Since most drilled formations contain little, if any, montmorillonitic clays, the bit cuttings are not dispersed. On the contrary, the low concentration of polymer prevents dispersion of these cuttings, permitting them to settle rapidly in the mud pits. The few remaining cuttings tend to remain large enough to have little effect on drilling rate. It has previously been noted that particles in the colloidal range are principally responsible for decreased drilling rate.

While higher concentrations of polymers, such as CMC, have little flocculating action on any clays, it has been found that, if the CMC is used in lower concentration with bentonitic clays, the CMC becomes so closely associated with the bentonite that a very low concentration remains free in the water. This concentration is in the range effective for flocculating purposes. While preparation of a drilling fluid from clear water is preferred, it will be understood that drilling fluids containing low concentrations of native solids can be used, if desired. The results reported in the table in which Xact clay was presented are indicative of the results to be expected in such cases.

A convenient concentrate or additive for forming or treating drilling fluids in a mixture of the polymer and bentonite. For forming drilling fluids from fresh water, the concentrate should contain about 100 times as much bentonite as polymer. For make-up addition during drilling operations, the additive may contain as little as 10 times as much bentonite as polymer. For use in preparing drilling fluids containing high concentrations of bentonite, as high as 1000 times as much bentonite as polymer may be used. Since the polymer is lost from the system on bit cuttings, it is ordinarily best to use an additive containing about 100 times as much bentonite as polymer and then add polymer unmixed with bentonite to increase the ratio of polymer to bentonite.

Some of the polymer, such as guar gum or the polyacrylamide hydrolytes, may be used alone to flocculate drilled solids and maintain clear water for drilling. In this case, a small amount will remain in the water when it is decided to mud-up. Theoretically this amount may be taken into account in calculating the quantity of polymer to add with the bentonite. Actually, however, this amount already in solution can be ignored since it is so small compared to the quantity required for beneficiating the bentonite.

By use of the polymer, the viscosity of water containing a very low concentration of bentonite can be increased and the fluid loss can be decreased to increase the efficiency of the water when used as a fracturing fluid. Due to the low concentration of bentonite, there is less tendency for the fracture to become plugged by the clay when the well is put back on production. The same advantage applies to dilute clay slurries used opposite zones to be perforated with bullet or jet perforators.

Still other advantageous applications of my invention will be apparent to those skilled in the art.

I claim:

1. An additive for increasing the viscosity of water consisting essentially of a mixture of from about 10 to 1,000 parts by weight of montmorillonitic clay and 1 part of polyacrylamide hydrolytes having from about 10 to about 120 amide groups for each carboxyl group, the polymerization having been carried to a degree such that a solution containing 0.5 percent by weight of the polymer in distilled water having a pH of 3 to 3.5 and a temperature of 21.5° C. has a viscosity of at least 4 centipoises as determined with an Ostwald viscosimeter.

2. The additive of claim 1 in which said clay is bentonite.

3. A low solids drilling fluid consisting essentially of water containing no more than about 20,000 parts per million of chloride and sulfate salts, from about 2 to about 7 percent by weight of a montmorillonitic clay, and from about 0.02 to about 0.5 pound per barrel of polyacrylamide hydrolytes having from about 10 to about 120 amide groups for each carboxyl group, the polymerization having been carried to a degree such that a solution containing 0.5 percent by weight of the polymer in distilled water having a pH of 3 to 3.5 and a temperature of 21.5° C. has a viscosity of at least 4 centipoises as determined with an Ostwald viscosimeter.

4. The drilling fluid of claim 3 in which said clay is bentonite.

5. A method of drilling a well comprising operating a bit in the bottom of said well to drill the well deeper and thus produce bit cuttings and circulating in said well the drilling fluid of claim 3, whereby a fast drilling rate is maintained due to the low solids content of the drilling fluid which results from flocculation of drilled clay solids, but the loss of the drilling fluid to porous formations penetrated by the well is maintained at a low value and sufficient viscosity is maintained to remove the bit cuttings from the well.

6. A method of drilling a well comprising operating a bit in the bottom of said well to drill the well deeper and thus produce bit cuttings and circulating in said well the drilling fluid of claim 4, whereby a fast drilling rate is maintained due to the low solids content of the drilling fluid which results from flocculation of drilled clay solids, but the loss of the drilling fluid to porous formations penetrated by the well is maintained at a low value and (Other references on following page)

sufficient viscosity is maintained to remove the bit cuttings from the well.

References Cited in the file of this patent

UNITED STATES PATENTS

| | | |
|---|---|---|
| 2,702,788 | Dawson | Feb. 22, 1955 |
| 2,731,414 | Binder et al. | Jan. 17, 1956 |
| 2,775,557 | Morgan | Dec. 25, 1956 |
| 2,778,427 | Cardwell et al. | Jan. 22, 1957 |
| 2,827,964 | Sandiford et al. | Mar. 25, 1958 |
| 2,854,407 | Mallory | Sept. 30, 1958 |
| 3,025,236 | Barrett et al. | Mar. 13, 1962 |

FOREIGN PATENTS 579,582 Canada _____ July 14, 1959

OTHER REFERENCES

McGhee: New Oil Emulsion Speeds West Texas Drilling, article in the Oil and Gas Journal, Aug. 13, 1956, pp. 110–112.

Mallory: How Low Solids Muds Can Cut Drilling Costs, article in the Petroleum Engineer, April 1957, pp. B21, B22, B23 and B24.

Gray: Chemicals in Drilling Mud, article in the Oil and Gas Journal, vol. 56, No. 50, Dec. 15, 1958 (pp. 90, 96 and 97).